C. F. HOTCHKISS.
JOURNAL BEARING.
APPLICATION FILED MAR. 2, 1914.
1,116,065.
Patented Nov. 3, 1914.
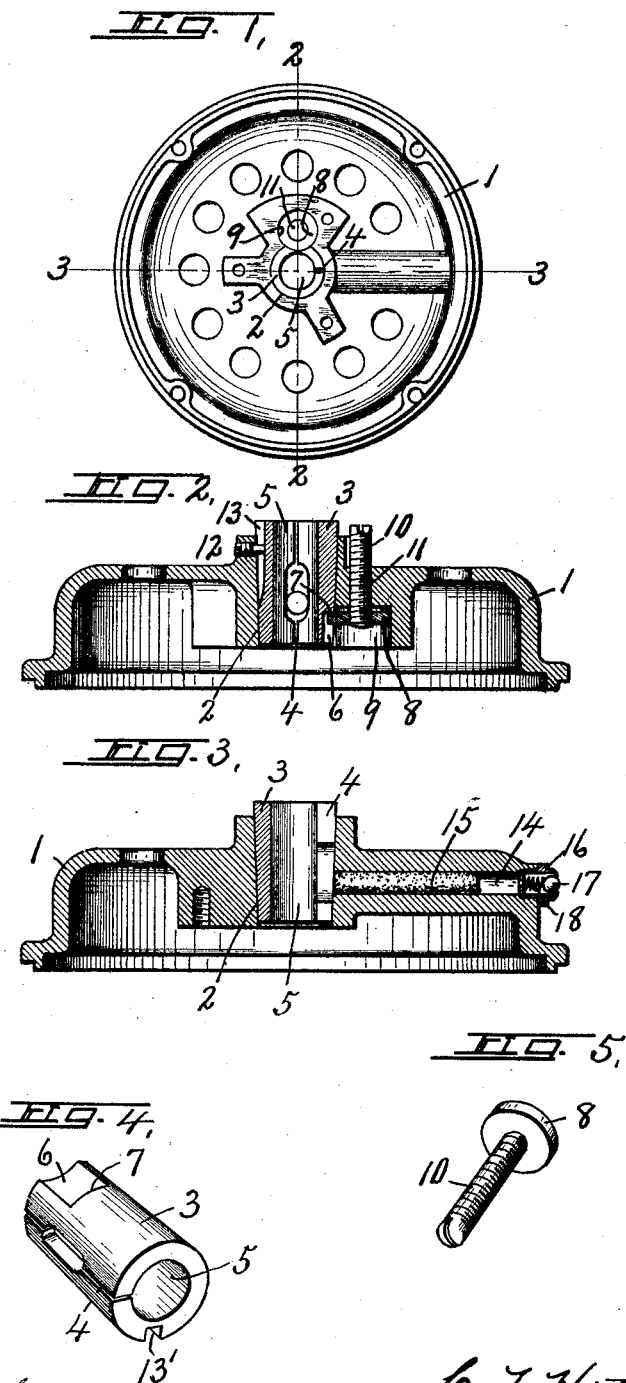
WITNESSES:
INVENTOR.
C. F. Hotchkiss,
BY
Howard P. Denison
ATTORNEY.

UNITED STATES PATENT OFFICE.

CLARENCE F. HOTCHKISS, OF BINGHAMTON, NEW YORK.

JOURNAL-BEARING.

1,116,065.  Specification of Letters Patent.  Patented Nov. 3, 1914.

Application filed March 2, 1914. Serial No. 821,963.

*To all whom it may concern:*

Be it known that I, CLARENCE F. HOTCHKISS, of Binghamton, in the county of Broome, in the State of New York, have invented new and useful Improvements in Journal-Bearings, of which the following, taken in connection with the accompanying drawings, is a full, clear, and exact description.

This invention relates to certain improvements in journal bearings involving the use of a tapering bushing split longitudinally through one side and slidably fitted in a correspondingly tapered bore for receiving a shaft or other revoluble element and taking up wear by slight axial adjustment of the bushing so as to assure a more perfect running fit of the shaft in said bushing. I have discovered, however, that in the use of this class of bearings for motor shafts and other revoluble elements, which are driven at a high rate of speed, the frictional heat and resultant expansion tend to produce excessive friction or binding of the shaft in the bushing to such an extent as to stop or at least retard the motor and that in many instances this objectionable result is aggravated by a tendency of the bushing to work inwardly or in the direction of its taper, thereby compressing it tightly upon the shaft.

The main object of my invention is to obviate these objectionable results by providing simple means adjustable at will for limiting or preventing the inward movement of the bushing to or beyond a predetermined point which will assure a free rotation of the shaft under the conditions referred to and at the same time permitting the bushing to be inserted or withdrawn by hand independently of its adjustable limiting stop.

Another object is to utilize the limiting stop as a means for holding the bushing against rotation in the bore of the casing in which it is mounted.

Other objects and uses relating to specific parts of the device will be brought out in the following description.

In the drawings Figure 1 is an inner face view of one end or head of an electric motor case showing one of my improved journal bearings therein. Figs. 2 and 3 are enlarged transverse sectional views taken respectively on lines 2—2 and 3—3, Fig. 1, Fig. 4 is a perspective view of the detached bushing. Fig. 5 is a perspective view of the detached adjustable limiting stop.

In illustrating one use of my invention, I have shown a cast-iron head —1— of an electric motor-case as provided with a central bore —2— tapered inwardly from its outer end for receiving a correspondingly tapered bushing —3— preferably of different material, such as bronze or brass which is split or divided longitudinally through one side at —4— and provided with a central cylindrical opening —5— in which one end of the motor shaft (not shown) is adapted to be journaled. This bushing is also provided with a circular recess —6— opening from its periphery part way only through the wall thereof and extending inwardly from the inner end through a portion of the length of the bushing to form a shoulder —7— which coöperates with an adjustable member or disk —8— to limit the inward movement of the bushing, said disk being movable in a circular recess —9— opening from the inner end of the hub of the head —1— so as to register with the circular recess —6—, thereby forming a key way for the adjustment of the disk —8—, the latter serving not only to limit the inward movement of the bushing but also holding it against rotary movement in the casing —1—. This disk is secured to the inner end of an adjusting screw —10— which engages in a threaded aperture —11— in the hub of the head —1— parallel with the axis of the bushing but at one side thereof, whereby the disk may be adjusted in the recesses —6— and —9— to any desired position for the purpose previously described. The bushing is additionally held against rotation and also against accidental displacement outwardly from the head —1— by means of a radial screw —12— in one side of the hub of the case having its inner end entering a key way —13— in the adjacent side of the bushing, said key way extending from the outer end of the bushing to a point some distance beyond its center to allow a limited endwise adjustment thereof. As previously stated, the periphery of the bushing is tapered and fitted with an easy sliding fit in the correspondingly tapered bore —2— so that by pressing it inwardly, it will be compressed upon the shaft to take up wear, thereby affording means for establishing an easy running joint between the bushing and shaft.

The disk —8— constitutes an adjustable stop against which the shoulder —7— of the bushing is adapted to abut to prevent undue inward movement of said bushing, thereby gradually reducing the liability of its binding upon the shaft which, of course, would tend to retard or stop the motor, it being understood that the limiting stop or disk —8— may be adjusted to any desired position by simply turning its screw —10— in one direction or the other. It will also be observed that by placing the stop at the inner end of the bushing or rather so as to engage the inner face of the shoulder —7— and by leaving the recess —6— open at its inner end, the bushing may be easily and quickly inserted or withdrawn independently of the screw —10— or its stop —8— by simply loosening the set screw or key —12—. This freedom of movement of the bushing irrespective of the adjusting screw —10— for the limiting stop —8— is one of the important features of my invention in that it enables the operator to press the bushing in by hand from its outer end, thereby avoiding the possibility of overtightening or unduly compressing the bushing upon the shaft as would be the case if it was adjusted by means of a screw or other mechanical device for the reason that this hand adjustment of the bushing enables the operator to determine more accurately when the bushing is in proper position by the sense of touch or pressure. The stop —8—, therefore, performs only the function of preventing the bushing from involuntarily or accidentally working inwardly to the extent of compressing it upon the shaft with sufficient friction to retard or stop the same. Furthermore, by tapering the bushing inwardly and allowing its free outward movement, it is more liable to free itself from binding upon the shaft in case it should become expanded by overheating, thereby additionally reducing the liability of retarding or stopping the motor. It sometimes happens, however, that when the shaft has a greater or less amount of endwise play, the tendency is to draw the bushing inwardly to such an extent as to cause it to bind upon the shaft, but by introducing the limiting stop in the manner previously described, this condition is prevented so that the life of the journal bearings is not only prolonged materially by reason of the ability of the operator to properly adjust the same to prevent undue wear, but the motor may be run with less power without the usual liability of stopping or retarding the same by overheating the bearings.

In connection with the split bearings, I have shown the head —1— of the case as provided with a radial passage —14— for receiving a lubricant which may be taken up by an absorbent wick —15—, the division —4— in the bushing being preferably registered with the lubricant channel or reservoir —14— so as to allow the lubricant to readily enter the bearing, the outer end of the channel being closed by a suitable cap —16— and valve —17— which is held closed by a suitable spring —18— as shown more clearly in Fig. 3.

What I claim is:

In combination with a motor case having a tapered bore and a threaded aperture parallel with the axis and at one side of the bore, a tapered bushing fitting and movable lengthwise in the bore, a screw engaged in said aperture, and a stop secured to the inner end of the screw in the path of inward movement of a portion of the bushing to limit the inward movement of said bushing without interfering with its free outward movement.

In witness whereof I have hereunto set my hand this 19th day of February, 1914.

CLARENCE F. HOTCHKISS.

Witnesses:
RAY M. GAFFNEY,
JOHN C. PHELPS.

Copies of this patent may be obtained for five cents each, by addressing the "Commissioner of Patents, Washington, D. C."